US005332218A

United States Patent [19]

Lucey

[11] Patent Number: 5,332,218

[45] **Date of Patent: * Jul. 26, 1994**

[54] AUTOMATED GOLF SWEEPSTAKES GAME

[76] Inventor: Trevor C. Lucey, 9322 Wister Dr., La Mesa, Calif. 91941

[*] Notice: The portion of the term of this patent subsequent to Aug. 27, 2008 has been disclaimed.

[21] Appl. No.: 749,259

[22] Filed: Aug. 23, 1991

Related U.S. Application Data

[63] Continuation-in-part of Ser. No. 303,123, Jan. 30, 1989, Pat. No. 5,043,889.

[51] Int. Cl.[5] .......................... A63F 9/22; G06F 15/44

[52] U.S. Cl. .......................... 273/138 A; 273/139; 273/439

[58] Field of Search .......................... 273/138 R, 138 A, 139, 273/439, 460, 259, 269; 364/412

[56] References Cited

U.S. PATENT DOCUMENTS

| | | | |
|---|---|---|---|
| 4,429,877 | 2/1984 | Coppock | 273/139 |
| 4,467,424 | 8/1984 | Hedges | 364/412 |
| 4,540,174 | 9/1985 | Coppock | 273/138 A |
| 4,669,730 | 6/1987 | Small | 273/138 A |
| 4,689,742 | 8/1987 | Troy | 364/412 |
| 4,775,937 | 10/1988 | Bell | 364/412 |
| 5,043,889 | 8/1991 | Lucey | 273/138 A |

*Primary Examiner*—Jessica J. Harrison
*Attorney, Agent, or Firm*—John R. Ross

[57] ABSTRACT

An apparatus and method for playing a golf sweepstakes game. Players seek to win the sweepstakes game by correctly predicting a portion of the outcome of a golf tournament. The players are provided with an access number. A code system allows the players to convert their selection of golfers into numbers which are inputted into a computer system along with the access numbers. The results of the golf tournament are also inputted into the computer system and the computer system determines the winner of the sweepstakes in accordance with a predetermined set of rules. Preferred rules call for the sweepstakes winner also to correctly predict a number (such as eight) of the tournament's runners up.

11 Claims, 3 Drawing Sheets

AUTOMATED GOLF SWEEPSTAKES GAME

This application is a continuation-in-part of Ser. No. 07/303,123 filed Jan. 30, 1989, now U.S. Pat. No. 5,043,889.

This invention relates to sweepstakes-type games and in particular to sweepstakes-type games used as a part of an advertising program for commercial goods and/or services.

BACKGROUND OF THE INVENTION

Sweepstakes-type games are well known. These games include lotteries and horserace betting. Sweepstakes are commonly used to promote the sale of magazines and books. In Europe and Latin America national sweepstakes games based on the outcome of soccer matches are very popular.

Computer system exist for reading, coded information directly into a computer memory so that the information can be processed by the computer.

In recent years computer controlled telephone equipment has been available which is capable of responding with verbal messages to distantly located telephone callers and to record in a computer memory information transmitted by the operation of touchtone buttons on the distant telephone.

OBJECTIVES OF THE INVENTION

An object of the invention is to provide apparatus for conducting a sweepstakes game based on participants predicting a portion of the outcome of golf tournaments. It is an object of this invention to provide apparatus that will enable the sponsors of the sweepstakes to evaluate all of the many expected entries using computer equipment so that the winner or winners can be determined quickly and efficiently. Another object of the invention is to develop interest in the products and services of sponsors of the sweepstakes game and of the advertisers which advertise their products and services on the television broadcasts of these golf tournaments. Where laws permit, another object of this invention is to provide a method for efficiently operating a sweepstakes for profit where sweepstakes participants would pay for the opportunity to play the sweepstakes game.

SUMMARY OF THE INVENTION

The present invention provides the apparatus for participation by a player in a sweepstake-type game whereby the player seeks to win the sweepstakes by accurately predicting a portion of the result of a golf tournament. Preferably, the players are provided with access identification in connection with the commercial marketing of goods or services. A coding means is provided for the players to convert their predictions into numbers or other symbols which can be processed automatically by a computer system. A processor input means accepts the coded predictions and communicates them to a processor. A means is provided for determining a set of winning numbers based on the results of a golf tournament and a processor is provided which compares the coded predictions with the set of winning numbers and determines the winner or winners of the sweepstakes.

DETAILED DESCRIPTION OF THE INVENTION

My preferred name for the sweepstakes game which will use the apparatus which is the subject of this invention is "Pro-Golf". In my preferred embodiment of the present invention, the sweepstakes game is sponsored as a part of a program for marketing one or Ere products or services. For example, with the purchase of a six pack of beer or a visit to an automobile dealership or a fast food restaurant, a customer or potential customer would receive a coupon with which he or she could play the sweepstakes. The coupon in this embodiment has the form shown in FIG. 1 or FIG. 2. The customer may also receive or have available a Pro-Golf program which gives the names and an individual Pro-Golf number of all or a substantial number of the participants in the tournaments which are the subject of the Pro-Golf sweepstakes game. As an example, excerpts from portions of such a program are included in Table I.

Preferably, for each golf tournament, the sponsors will also make available to their customers or potential customers a list of the golfers that are expected to participate in the tournament.

The object of the game in this preferred embodiment is for the player to pick (1) the winner of the tournament and (2) the eight golfers other than the winner who have the lowest tournament scores. The player will use one of the coupons to record his predictions.

TABLE I

| PRO-GOLF NUMBER | GOLFER |
|---|---|
| 1 | Jack Nicklaus |
| 2 | Tom Watson |
| 3 | Lee Trevino |
| 4 | Ray Floyd |
| 5 | Hale Irwin |
| 6 | Tom Kite |
| 7 | Lanny watkins |
| . | |
| . | |
| . | |
| 15 | Arnold Palmer |
| 16 | Gary Player |
| . | |
| . | |
| . | |
| 25 | Gene Littler |
| . | |
| . | |
| . | |
| 27 | J. C. Sneed |
| . | |
| . | |
| . | |
| 52 | Chi Chi Rodriguez |
| . | |
| . | |
| . | |

TABLE I-continued

| PRO-GOLF NUMBER | GOLFER |
|---|---|
| 250 | Gary Pinnus |
| . | |
| . | |
| . | |
| 300 | Richie Karl |

Figure 1:
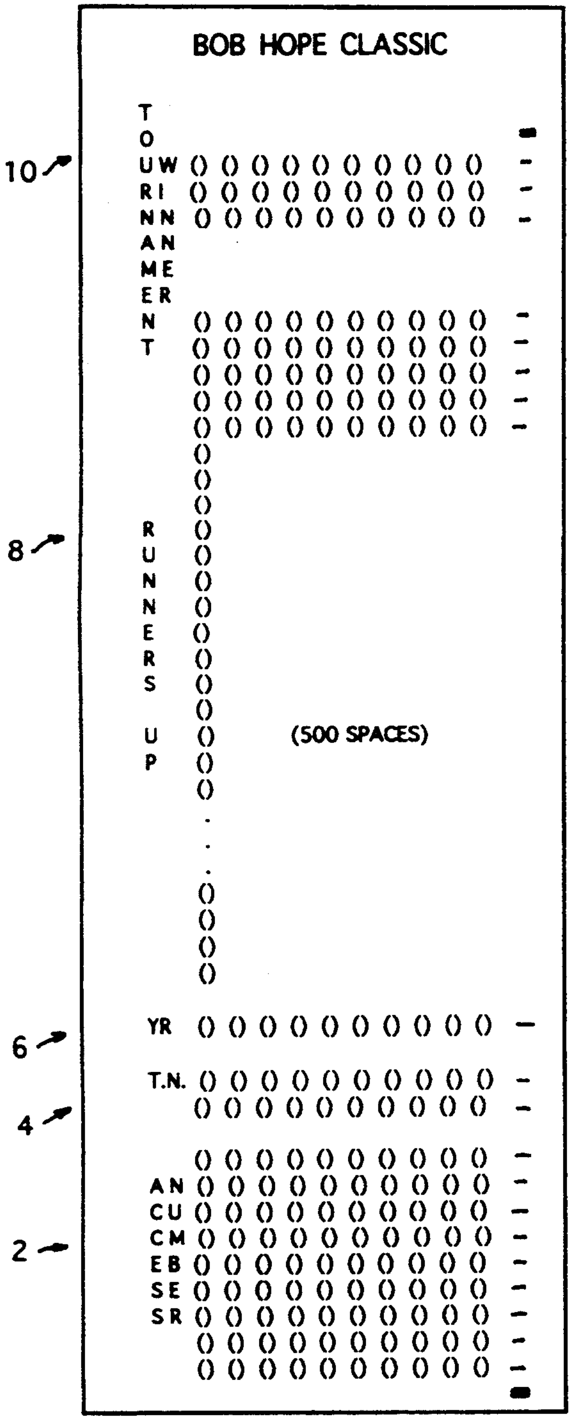
FIG. 1 is a drawing of a coupon used in practicing a sweepstakes game according to the present invention.
Figure 3:
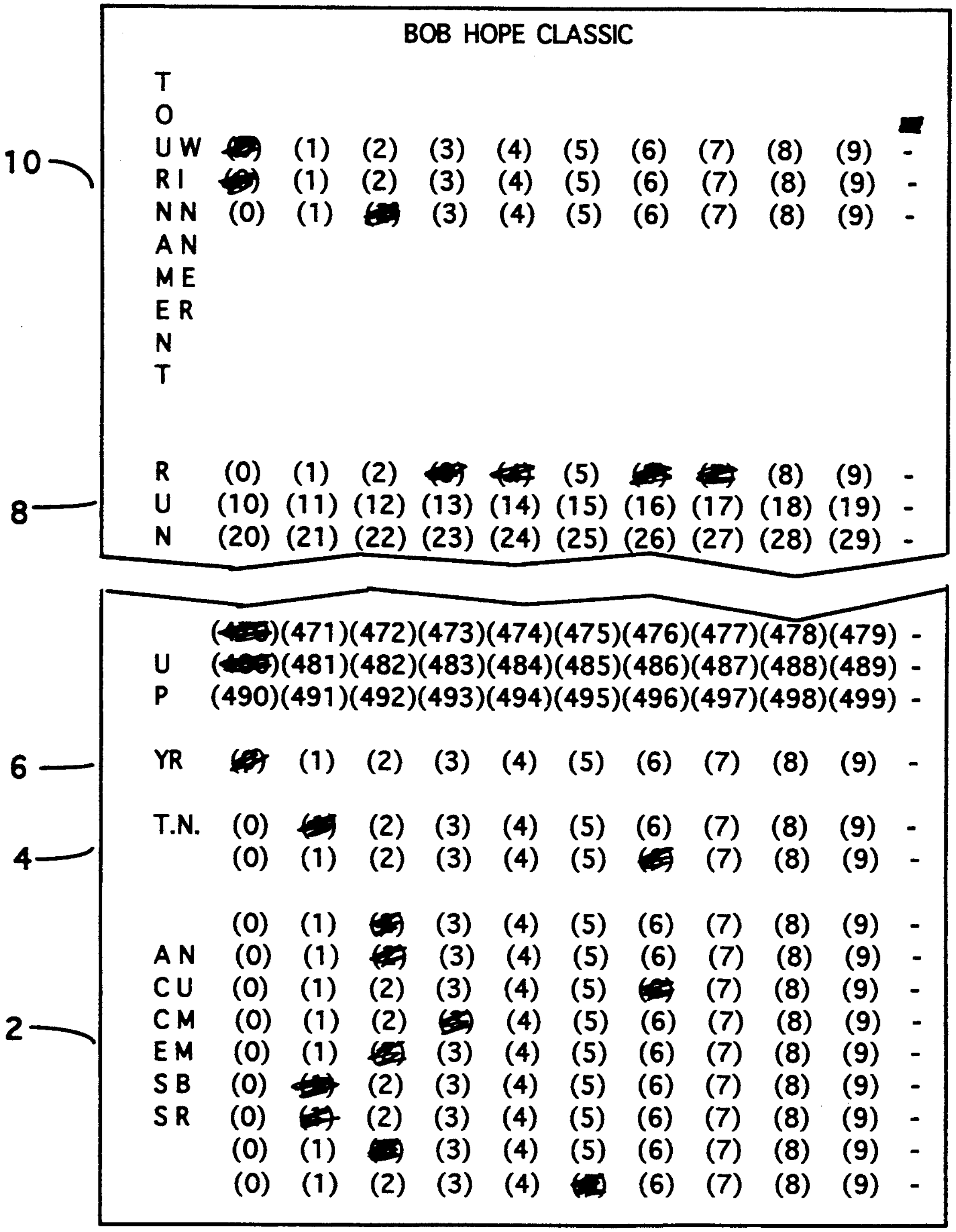
FIG. 3 is a drawing of portions of a marked up version of the coupon shown in FIG. 1

The FIG. 1 coupon is in a form for use in automatic computer controlled equipment made by Scantron Corporation, headquartered in Tustin, Calif. An enlarged marked up version of this coupon is shown in FIG. 3. This particular coupon comprises a nine digit access number 2 which is preprinted on the coupon to provide up to one billion uniquely numbered coupons for each tournament. It also comprises a preprinted two digit number 4 to identify the tournament. Preferably, only one tournament per week would be covered by the sweepstakes game. This would require 52 separate tournament numbers. A one digit number shown at 6 identifies the calendar year of the tournament. All of this information is preprinted of the coupon prior to distribution to customer participation.

The coupons are distributed to customers or potential customers in connection with a marketing program. Those who want to participate are instructed to pick the tournament winner and eight golfers other than the winner who will have the lowest scores. On the coupon shown in FIG. 1 and FIG. 3 at 8 there are up to 500 numbers from 0 to 499 which correspond to up to 500 tournament golfers. The winner is indicated by shading one number in each of three columns shown at 10 on FIG. 1 and FIG. 3. The participant also shades in eight other numbers at 8 to indicate the eight other lowest shooting golfers.

The coupon in one preferred embodiment comes preprinted with an access number, the tournament designation and the year. The coupon shown in FIG. 3 shows a preprinted access number of 226,321,125; it is marked 16 to correspond to the Bob Hope Classic and 0 to represent calendar year 1990. As an example it has also been marked to predict Tom Watson to win and Tom Kite, Gary Player, J. C. Sneed, Lee Trevino, Ray Floyd, Gary Pinus, Lanny Watkins and Richie Karl as runners up.

In another preferred embodiment the coupon is not marked with the tournament number or the name of the tournament. In this case the participants are instructed to shade in the number of the tournament from a predetermined numbered list of Pro-Golf tournaments. The year can either be premarked or left for the participant to mark.

The completed coupon shown in FIG. 1 and FIG. 8 is then taken to a card reader which may be preferably located at a sponsor's store such as a fast food restaurant and the participant's prediction is recorded by inserting the card into a card reader where it is read automatically and the information is stored by a computer in a form such that the information can be readily recalled by a computer processor. If a card reader facility is not near the player or if going to one is inconvenient the player could mail his card to a reader location. A good card reader for location at sponsors facilities all over the country is Scantron Model 1300 Optical Mark Reader/-Data Terminal. It costs less than $2,000 and operates with a variety of personal computers. For a central location processing hundreds of thousands of coupons a higher speed reader such as Scantton System 9000 should be used. (Equipment simular to the Scantron equipment is available from National Computer Systems of Mineapolis, Minn.) For a nationwide sweepstakes game, all of these readers would be tied together into a central computer. As soon as the tournament is over the final golf scores are fed into the computer and the computer is programed to determine the winner or winners of the sweepstakes. It should require only a few seconds for the computer to determine the winner, so it should be possible to announce the winning access number or numbers to the television audience while the .last group of golfers is walking off the 18th green. Or if desired, the name or names of the sweepstakes winner or winners could be announced.

Figure 2:
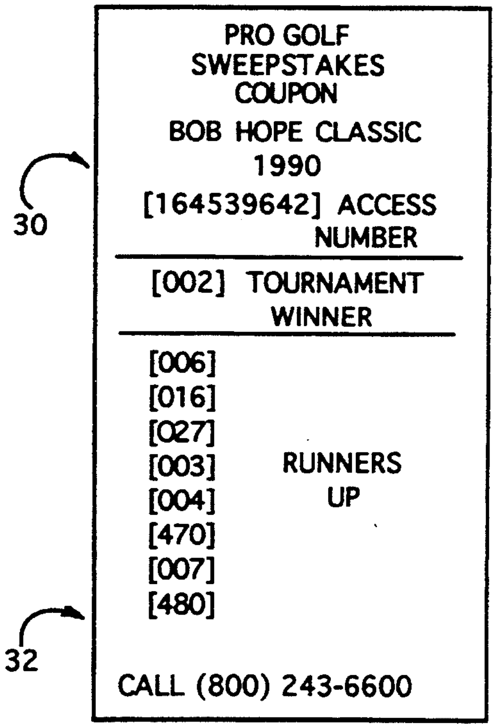
FIG. 2 is a drawing of another coupon used in practicing a sweepstakes game according to :the present invention.
Figure 4:
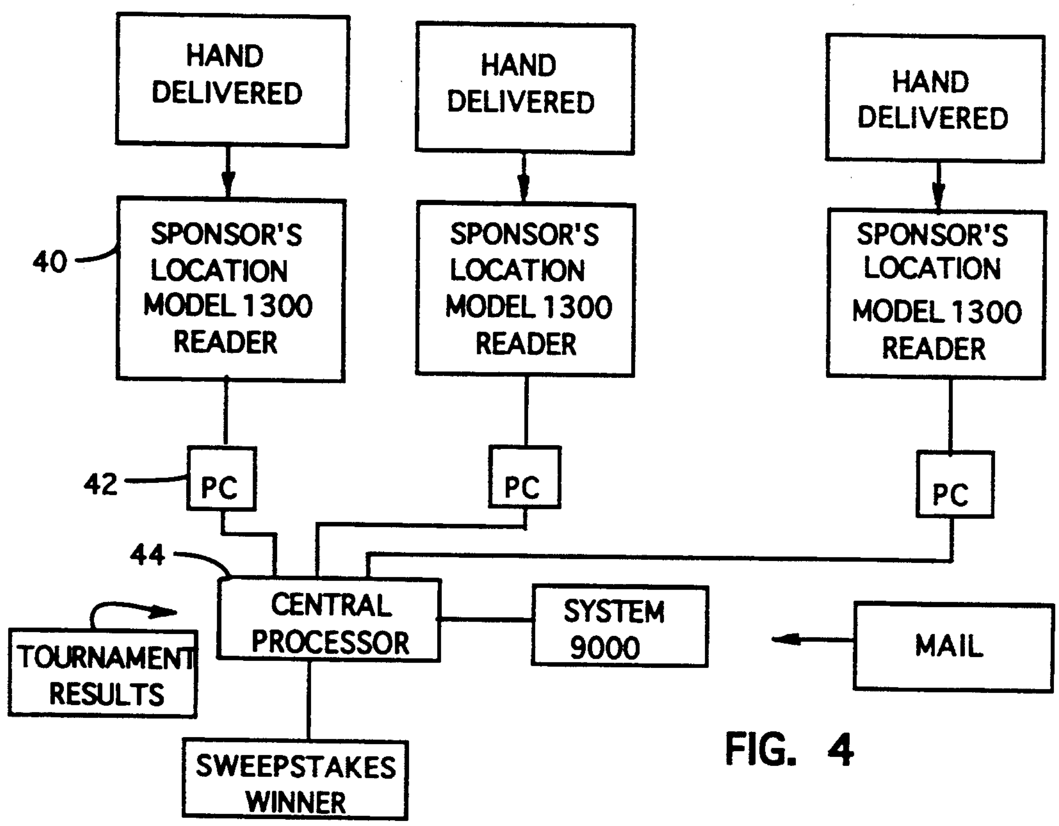
FIG. 4 is a simplified block diagram of the principal components employed for practicing a sweepstakes game according to one embodiment the present invention.

An alternate coupon is shown in FIG. 2 which may be used by participants having available to them a touchtone telephone. Actually the only critical item on the coupon in FIG. 2 is the access number 30. In this case the access number is 164,539,842. The coupon should also provide a telephone number 32 for the player to call his predictions in to. The telephone number preferably will be a local number or a free long distance (800 type) number when this invention is used as a part of an advertising plan. However, when used as a part of a sweepstakes game for profit, a fee could be charmed through the telephone company by using a for fee type telephone number. The rest of the information on the coupon shown in FIG. 2 is merely to help the participant transmit his predictions and to serve as a record of the prediction. The participant writes his predictions and other called for information into the blanks on the coupon. For example, FIG. 2 is marked to show the same predictions discussed above.

this case the coupon instructs the player to call in his predictions to (800) 243-6600. A processing system including a computer controlled telephone answering device is provided at that number. The system is preferably programmed to (1) answer the telephone, (2) instruct the participant calling to type his or her predictions and other needed information into the participant's touchtone telephone, (3) record the information provided by the participant, and (4) inform the participant if the information provided by the participant is not in the correct form, in my preferred embodiment, the system can also tell the participant that his or her access number is not valid or has already been used FIG. 4 shows a general layout plan for a sweepstakes game using the card readers. A plurality of card readers 40 and PC's 42 located at sponsor's stores all over the country are connected by telephone lines or satellite to a central processor 44. The central processor is preferably a high speed large memory computer. Also connected to the central processor 44 is one or more System 9000 Optical Mark Readers 46 which is located at a central mail station to read coupons sent in by mail. Once the golf tournament is over an operator inputs the results of the tournament into the central processor so that the winning set or sets of numbers are determined.

To win a participant must correctly predict the tournament winner and the other eight golfers with the lowest scores in the order of their finish. Due to ties in the ranks of the runners up, there could be more than one set of winning numbers. Also, in case of tie, all the winners will share the grand prize. If no player has guesses right, the prize could be awarded to the best guess or carried forward to the next week.

The central processor thus determines the winning combinations of golfer Pro-Golf numbers then determines the access numbers of the winning players from information previously collected. Preferably, these determinations can be .made within a few seconds or minutes after the tournament is over and as suggested above, the winners can be announced to the television audience while the last group of golfers is walking off the 18th green. This aspect of the game will vastly increase the interest of the television audience in the tournament, especially for those participants who have predicted the winner to be a golfer who is still in contention near the end of the tournament. There should be plenty of time for the predictions to be processed and available in the memory of the central processor at the conclusion of the tournament if the predictions are received respectively at the sponsor's readers and at the central mail station prior to the start of the tournament.

Figure 5:
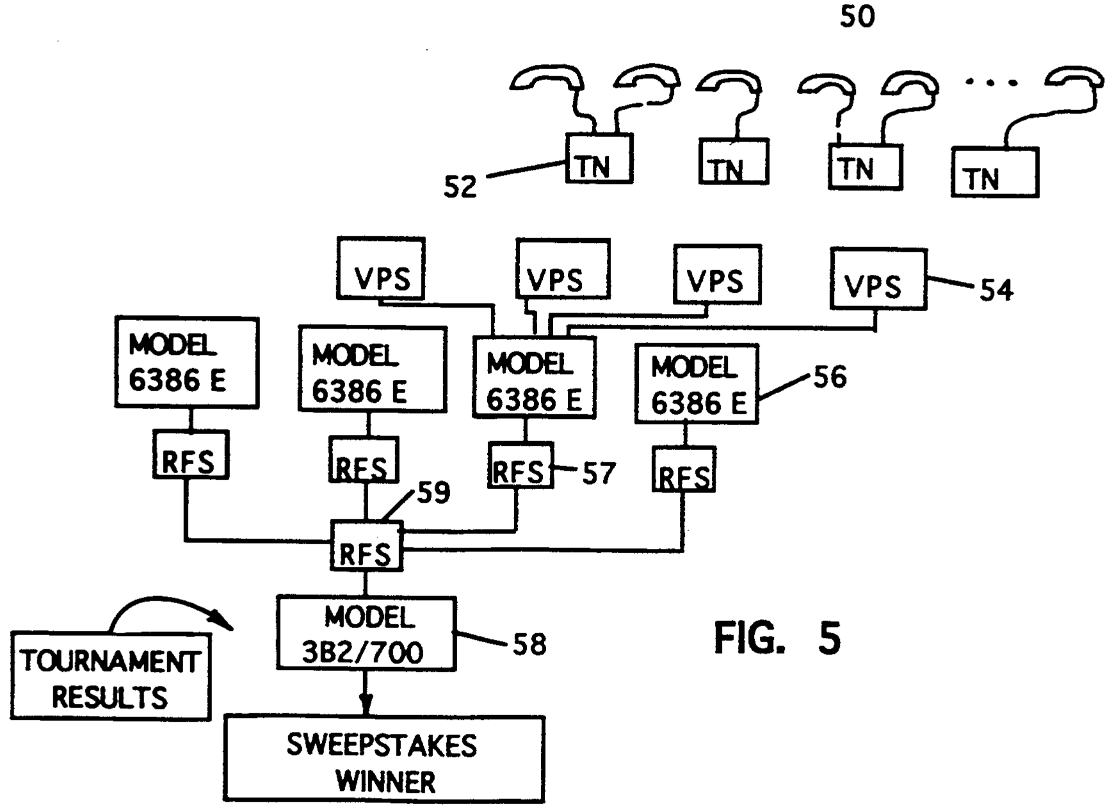
FIG. 5 is a simplified block diagram of the principal components employed for practicing a sweepstakes game according to another embodiment of the present invention.

FIG. 5 shows a general layout plan for a sweepstake game using the touchtone telephone system discussed above. Preferably, the information is transmitted by many thousands of touchtone telephones 50 through a telephone network 52 to a plurality of telephone receiving centers. Each of these receiving centers comprise a voice power board 54, such as AT&T Model VP4, enabling the receiving center to instruct the player on how to transmit his prediction. Four voice power boards are controlled by a receiving computer 56 such as AT&T Model 6386E with a remote file system 57, The Model 6386E's are connected to a central computer 58 such as AT&T Model 3B2/700 which also has a remote file system 59 so that it can communicate with a large number of the receiving computers 56. Software for the voice boards is commercially available from software companies such as CIA, Each voice power board can handle four telephone calls simultaneously. An unlimited number of Model 6386E's can be connected to the central computer and Model 3B2/700 can efficiently handle about 60 to 100 calls simultaneously on a real time basis. More powerful central computers such as AT&T Model 3B4000 can provide increased capacity.

Following is a typical "conversation" between a player and a receiving center which takes place during the week prior to the Bob Hope Desert Classic Golf Tournament. Assume the receiving centers telephone number is (800) 262-5454, the participant's access number is 64589642, the participant picks the winner and the next eight lowest shooters referred to above:

| PLAYER TOUCHES | RECIEVING CENTER SAYS |
|---|---|
| 8002625454 | "Hello. Thank you for playing Pro-Golf in the Bob Hope Classic Tournament. Please press your Access Number." |
| 64539642 | "Thank you. Now press your predicted winner's Pro-Golf number then a star." |
| 002* | "Thank you. Now press the Pro-Golf numbers of eight golfers you think will have the lowest scores in order with one star after each Pro-Golf number." |
| 6*16*27*3*4*470*7*480* | "Thank you. You have predicted Tom Watson to win and Tom Kite, Gary Player, J. C. Sneed, Lee Trevino, Ray Floyd, Gary Pinus Lanny Watkins and Richie Karl as runners up in that order. The tournament will be televised on ABC beginning at 11 AM EST Saturday, January 9". |

It will take about one minute for this "conversation". Thus, one telephone receiving center could handle up to about 5,000 entries in seven 12-hour days. To handle 500,000 entries; therefore will require at least about 1,000 receiving centers and on a 16 to 1 ratio about 63 processors.

The layout shown in FIG. 4 can be combined with the layout shown in FIG. 5 by tying together the central processor 44 shown in FIG. 4 and the central computer 58 shown in FIG. 5. Alternatively the two processors could be tied to a third meter processor.

Preferably the sweepstakes gas will be played on a national and maybe international scale with millions of players and huge prizes. However this invention can just as well be practiced on a very small scale. For example a single local sponsor might want to sponsor the sweepstake game for his local customers numbering in the hundreds or thousands. In this case the prizes would be much smaller but the game can be structured to give the participants a correspondingly better chance of winning. On this local scale the sweepstakes could be handled without the central processors 44 and 58 shown in FIGS. 4 and 5. The needed equipment would be reduced to as few as one card reader 40 and a personal computer 42 as shown in FIG. 4 all of which could be purchased for less than $5000. Or alternatively a small time operator could get by with a single Model 6386E computer 56 and one to four voice power boards 54 as indicated in FIG. 5 Again the cost of this system is only a few thousand dollars. The cost could be reduced even further by renting the equipment.

There are many ways to determine the winners of the sweepstakes in addition to the one described above. There is nothing sacred about the number 8. Instead of determining the sweepstakes winner on the tournament results the sweepstakes winner could be based on the results of only the final round. This would preferably man that entries would be submitted just prior to the playing of the final round. The game could obviously be changed to require the prediction of six ten or any other reasonable number of golfers. Prizes could be awarded on many different criteria For example in addition to the sweepstakes prize a lessor prize could be awarded to everyone who predicts the winner and at least two of the eight runners up. Greater prizes could be given to those who correctly predict larger numbers of the runners up.

Some sponsors my want to open the game up to anyone who wants to play. In this case an access number would not be required. The rules could be changed to require the player to shade in his social security number or his telephone number. Using the social security number might discourage players from submitting more than one entry. Therefore it might be good to add places for social security numbers on the coupons shown in FIG. 1 and FIG. 2.

It is to be understood that while certain form of the present invention have been illustrated and described herein it is not to be limited to the specific form or arrangement of parts described and shown.

What is claimed and desired to be secured by Letters Patent is as follows:

1. Apparatus for participation by a plurality of participants in a sweepstakes-type game where said participants seek to win said sweepstakes by accurately predicting a portion of the results of a golf tournament said apparatus comprising:

(a) a coding means whereby said participants' predictions of said portion of the results of the tournament are coded to produce a coded prediction comprising a set of numbers, (b) a processor entry means adapted to accept said coded predictions and communicate said coded predictions to a processor means, (c) a means for determining at least one set of winning numbers where said at least one set of winning numbers is based at least in part on an identification of a plurality of golfers who have the lowest scores in the tournament, (d) a processor means communicating with said processor input means and adapted to compare said coded predictions with said at least one set of winning numbers and to determine identification of the winning participant or participants.

2. Apparatus as set forth in claim 1 and further comprising an access identification means for providing each of said participants with an access identification indicating the participants' right to participate in said sweepstakes game.

3. Apparatus as set forth in claim 1 wherein said coding means is a list of all or essentially all of the golfers participating in said tournament with each such golfer having assigned to him or her his or her own individual number.

4. Apparatus as set forth in claim 1 wherein said processor input means is an optical reader.

5. Apparatus as set forth in claim 4 wherein said processor input means is an optical mark reader.

6. Apparatus as set forth in claim 1 wherein said processor input means comprises a touchtone telephone.

7. Apparatus as set forth in claim 6 wherein said processor input means further comprises a computer operated telephone answering and recording system.

8. Method of conducting a sweepstakes game utilizing a digital computer and a computer input device controlled by said digital computer wherein the winner of the sweepstakes is a participant who wins by correctly predicting a portion of the results of a golf tournament such method comprising the steps of:

(a) assigning golfers participating in the tournament individual numbers (b) requiring said players to predict the winner of the tournament and a plurality of golfers other than the winner who will have the lowest scores and to form those predictions into a numerical form using said golfers' individual numbers, (c) requiring said participants to input said predictions in numerical form into said computer input device, (d) programing said digital computer to store said predictions, (e) inputing the results of said tournament into said digital computer and (f) programing said digital computer to determine the winner or winners of said sweepstakes based on the results of said tournament.

9. The method set forth in claim 8 wherein said computer input device in an optical mark reader.

10. The method set forth in claim 9 wherein said computer input device comprises a touchtone telephone.

11. The method set forth in claim 10 wherein said computer input device further comprises a computer operated telephone answering and recording system.

* * * * *